United States Patent
Zeuch et al.

(10) Patent No.: US 10,915,127 B2
(45) Date of Patent: Feb. 9, 2021

(54) PARAMETERIZABLE ENERGY SUPPLY DEVICE

(71) Applicant: PHOENIX CONTACT GMBH & CO KG, Blomberg (DE)

(72) Inventors: Jochen Zeuch, Blomberg (DE); Hartmut Henkel, Blomberg (DE); Patrick Schweer, Hameln (DE)

(73) Assignee: PHOENIX CONTACT GMBH & CO KG, Blomberg (DE)

( * ) Notice: Subject to any disclaimer, the term of this patent is extended or adjusted under 35 U.S.C. 154(b) by 106 days.

(21) Appl. No.: 15/307,452

(22) PCT Filed: Apr. 23, 2015

(86) PCT No.: PCT/EP2015/058801
§ 371 (c)(1),
(2) Date: Oct. 28, 2016

(87) PCT Pub. No.: WO2015/165796
PCT Pub. Date: Nov. 5, 2015

(65) Prior Publication Data
US 2017/0052555 A1    Feb. 23, 2017

(30) Foreign Application Priority Data
Apr. 28, 2014    (DE) .................. 10 2014 105 913

(51) Int. Cl.
*G05F 1/66* (2006.01)
*G06F 1/26* (2006.01)
*G05B 19/042* (2006.01)

(52) U.S. Cl.
CPC ............. *G05F 1/66* (2013.01); *G05B 19/042* (2013.01); *G05B 19/0423* (2013.01); *G06F 1/26* (2013.01);
(Continued)

(58) Field of Classification Search
CPC ..... G05F 1/66; G05B 19/042; G05B 19/0423; G05B 2219/25092; G05B 2219/25196;
(Continued)

(56) References Cited

U.S. PATENT DOCUMENTS 8,902,801 B2    12/2014    Probst et al.
2004/0107398 A1*    6/2004    Johnson ................ H03M 13/09
                                                    714/758

(Continued)

FOREIGN PATENT DOCUMENTS

CN    102112932 A    6/2011
CN    203275934 U    11/2013
(Continued)

OTHER PUBLICATIONS

Diehl & Eagle Picher, "Battery Management: 4 µA in Sleep Mode," URL: http://www.energie-und-technik.de/energiespeicher/artikel/101202/, Sep. 13, 2013.
(Continued)

*Primary Examiner* — Mohamed Barakat
(74) *Attorney, Agent, or Firm* — Workman Nydegger (57) ABSTRACT

The invention relates to a parameterizable energy supply device comprising; a wireless communication interface for capturing parameterization data for arametizing the parameterizable energy supply device by means of a communication network; and a processor which is designed to control at least one operational parameter of the parameterizable energy supply device based on the captured parameterization data.

20 Claims, 4 Drawing Sheets

(52) U.S. Cl.
CPC .... *G06F 1/266* (2013.01); *G05B 2219/25092* (2013.01); *G05B 2219/25196* (2013.01); *G05B 2219/31197* (2013.01)

(58) Field of Classification Search
CPC .. G05B 2219/31197; G06F 1/26; G06F 1/266
See application file for complete search history.

(56) References Cited

U.S. PATENT DOCUMENTS

| | | | | |
|---|---|---|---|---|
| 2005/0108442 | A1* | 5/2005 | Aschenbrenner | G05B 19/0423 710/1 |
| 2008/0102754 | A1* | 5/2008 | Heinemann | G05B 19/4183 455/41.2 |
| 2011/0134817 | A1 | 6/2011 | Probst et al. | |
| 2012/0266007 | A1* | 10/2012 | Menon | G06F 1/26 713/340 |
| 2012/0286939 | A1* | 11/2012 | Cote | G06Q 10/08 340/10.6 |
| 2014/0070919 | A1* | 3/2014 | Jackson | G08C 17/02 340/5.61 |
| 2015/0130296 | A1* | 5/2015 | Washiro | B60L 11/1816 307/140 |
| 2015/0195099 | A1* | 7/2015 | Imes | G05B 15/02 700/275 |

FOREIGN PATENT DOCUMENTS

| | | |
|---|---|---|
| CN | 103477302 A | 12/2013 |
| DE | 102012203585 A1 | 9/2013 |
| WO | 2006056532 A1 | 6/2006 |
| WO | 2012145402 A1 | 10/2012 |

OTHER PUBLICATIONS

German Search Report for corresponding German Application No. 102014105913.1, dated Nov. 19, 2014.
International Search Report for corresponding International PCT Application No. PCT/EP2015/058801, dated Sep. 7, 2015.
"Introduction to NFC," URL: http://www.adafruit.com/datasheets/Introduction_to_NFC_v1_0_en.pdf, Forum.Nokia, Apr. 19, 2011, Version 1.0.
Chinese Office Action from CN Application No. 201580020157.3, dated Jun. 5, 2018.

* cited by examiner

PARAMETERIZABLE ENERGY SUPPLY DEVICE

BACKGROUND

The present invention relates to the parameterization of an energy supply device.

A parameterizable energy supply device such as a universal voltage supply unit or a universal current supply unit can have a plurality of configurable operating parameters. For example, an electrical output voltage or an electrical output current of the parameterizable energy supply device can be set. The operating parameters can often be adjusted by means of control elements such as buttons or knobs or by means of a contact-based or wire-connected communication interface such as a serial interface or an interface pursuant to the Power Management Bus (PMBus) standard.

A communication device, e.g. a computer, can be used for the parameterizing of a parameterizable energy supply device via a contact-based communication interface. The parameterizable energy supply device and the communication device can hereby have different electrical potentials. Since the parameterizable energy supply device and the communication device are not galvanically isolated, electrical transient currents can flow between the parameterizable energy supply device and the communication device. Furthermore, the respective contact-based communication interfaces require complex galvanic isolation for the parameterizing of a plurality of parameterizable energy supply devices with a communication device, particularly when the plurality of parameterizable energy supply devices are connected in series.

SUMMARY

The task on which the present invention is based is that of specifying an efficient concept for the galvanically isolated parameterization of a parameterizable energy supply device.

The subject matter solves this task by means of the features of the independent claims. Advantageous embodiments of the invention constitute the subject matter of the figures, the description and the dependent claims.

According to a first aspect of the invention, the task is solved by a parameterizable energy supply device, comprising: a wireless communication interface for receiving parameterizing data for parameterizing the parameterizable energy supply device via a communications network; and a processor which is designed to set at least one operating parameter of the parameterizable energy supply device on the basis of the received parameterizing data. This thereby achieves the advantage of being able to provide a parameterizable energy supply device which can be galvanically isolated from a communication device for the parameterizing of the energy supply device.

The parameterizable energy supply device can be a voltage supply unit or a current supply unit having at least one configurable operating parameter. The operating parameter can be a target value for an electrical output voltage or an electrical output current of the parameterizable energy supply device. For example, the parameterizable energy supply device comprises an electronically adjustable potentiometer for adjusting the electrical output voltage or the electrical output current of the parameterizable energy supply device. Furthermore, the operating parameter can be associated with an electrical output characteristic curve of the parameterizable energy supply device or an overload response of the parameterizable energy supply device. When the parameterizable energy supply device further comprises a signal input, the operating parameter can then be a parameter for evaluating the signals received via the signal input. If the signal input is for example designed to remotely activate the parameterizable energy supply device, the operating parameter can then be an electrical voltage threshold for the input signal, wherein the parameterizable energy supply device is activated if the electrical voltage of the input signal exceeds the threshold and/or is deactivated if the electrical voltage of the input signal undercuts the threshold.

The parameterizing data can comprise an operating parameter and/or information for selecting an operating mode or an operating parameter. As an example, the parameterizable energy supply device has a first operating mode with predetermined first operating parameters and a second operating mode with predetermined second operating parameters, wherein the respective operating mode is set on the basis of said information.

The processor can further be designed to check the received parameterizing data and/or operating parameter for validity. For example, the operating parameter can be checked as to whether it falls short of or exceeds a predetermined threshold. Furthermore, the validity of the parameterizing data and/or the operating parameter can be checked by means of cyclic redundancy, e.g. pursuant to the Cyclic Redundancy Check 8 (CRC-8) standard.

The wireless communication interface can be a radio frequency identification interface for communicating via Radio Frequency Identification (RFID), e.g. pursuant to the ISO/IEC 14443 or ISO/IEC 18000-3 standard. The wireless communication interface can furthermore be a near field communication interface for communicating via Near Field Communication (NFC), e.g. pursuant to the ISO/IEC 14443 or ISO/IEC 18092 standard. The wireless communication interface can furthermore be configured to communicate pursuant to the Bluetooth, ZigBee or Wireless Local Area Network (W-LAN) standards.

The communications network can be a radio network, e.g. a near field communication network, a telephone network, e.g. a mobile radio network, a computer network, e.g. a Wireless Local Area Network, and/or the internet.

In one advantageous embodiment of the parameterizable energy supply device, the parameterizable energy supply device is designed with a memory for storing the received parameterizing data, wherein the processor is designed to read out the parameterizing data from the memory and set the operating parameter of the parameterizable energy supply device on the basis of the parameterizing data as read. This thereby achieves the advantage of being able to permanently store the operating parameter setting.

The memory can comprise an electrically erasable programmable read-only memory, e.g. Electrically Erasable Programmable Read-Only Memory (EEPROM). The processor can further be designed to read the parameterizing data from the memory upon the parameterizable energy supply device being activated.

In a further advantageous embodiment of the parameterizable energy supply device, the wireless communication interface is designed to wirelessly receive the parameterizing data from a communication device via the communications network. This thereby achieves the advantage of the communication device being able to efficiently parameterize a plurality of parameterizable energy supply devices.

The communication device can be a computer, a smartphone or a hand-held device. The communication device can furthermore be a mobile communication device.

In a further advantageous embodiment of the parameterizable energy supply device, the wireless communication interface is further designed to transmit the operating parameter to a communication device via a communications network. This thereby achieves the advantage of enabling realization of bi-directional communication between the parameterizable energy supply device and the communication device.

In a further advantageous embodiment of the parameterizable energy supply device, the wireless communication interface can be wirelessly supplied with electrical energy. This thereby achieves the advantage of the parameterizable energy supply device being able to be parameterized when in the deactivated state.

The parameterizable energy supply device can furthermore be parameterized when accommodated within a casing.

In a further advantageous embodiment of the parameterizable energy supply device, the wireless communication interface comprises a near field communication interface. This thereby achieves the advantage of enabling efficiently receiving of the parameterizing data and the electrical energy.

The near field communication interface can be designed to communicate via Near Field Communication (NFC), e.g. pursuant to the ISO/IEC 14443 or ISO/IEC 18092 standard.

In a further advantageous embodiment of the parameterizable energy supply device, the wireless communication interface is arranged within a housing of the parameterizable energy supply device or integrated into a housing wall of a parameterizable energy supply device housing. This thereby achieves the advantage of enabling the space-saving integration of the wireless communication interface in the parameterizable energy supply device.

In a further advantageous embodiment of the parameterizable energy supply device, the wireless communication interface comprises an antenna arranged within a housing of the parameterizable energy supply device or integrated into a housing wall of a parameterizable energy supply device housing. This thereby achieves the advantage of enabling a particularly compact design to the parameterizable energy supply device.

The antenna can be formed by circuit paths on a circuit board or printed circuit board. The housing of the parameterizable energy supply device can furthermore be a plastic housing or comprise a housing element through which electromagnetic signals can pass.

In a further advantageous embodiment of the parameterizable energy supply device, the operating parameter is or comprises an electrical output voltage and/or an electrical output current and/or a frequency of the electrical output voltage and/or a frequency of the electrical output current of the parameterizable energy supply device. This thereby achieves the advantage of the electrical output signal of the parameterizable energy supply device being able to be parameterized.

In a further advantageous embodiment of the parameterizable energy supply device, the parameterizable energy supply device is configured with a display mechanism for displaying the operating parameter. This thereby achieves the advantage of being able to adjust the operating parameter of the parameterizable energy supply device displayed by the display mechanism.

The display mechanism can comprise a light-emitting diode (LED) or a liquid crystal display. For example, the liquid crystal display is set to display either the target value for the electrical output voltage of the parameterizable energy supply device or the target value for the electrical output current of the parameterizable energy supply device.

In a further advantageous embodiment of the parameterizable energy supply device, the parameterizable energy supply device is designed with a contact-based communication interface for transmitting the operating parameter via a further communications network. This thereby achieves the advantage of being able to transmit the operating parameter to a device for monitoring the parameterizable energy supply device.

The contact-based communication interface can be a serial interface or an interface pursuant to the Power Management Bus (PMBus) standard.

The further communications network can be a wired network, a telephone network, a computer network, e.g. a Local Area Network (LAN) and/or the internet.

According to a second aspect of the invention, the task is solved by a communication device for the parameterizing of a parameterizable energy supply device via a near field communication network, comprising: a user interface for defining parameterizing data for the parameterizing of the parameterizable energy supply device; and a near field communication interface for transmitting the defined parameterization data to the parameterizable energy supply device via the near field communication network. This thereby achieves the advantage of being able to provide a communication device for the parameterizing of the parameterizable energy supply device which can be galvanically isolated from the parameterizable energy supply device.

The communication device can be a computer, a smartphone or a hand-held device. The communication device can furthermore be a mobile communication device. The user interface can comprise a keyboard, a display mechanism and/or a touchscreen.

In one advantageous embodiment of the communication device, the near field communication interface of the communication device is further designed to wirelessly supply a near field communication interface of the parameterizable energy supply device with electrical energy. This thereby achieves the advantage of the parameterizable energy supply device being able to be parameterized when in the deactivated state.

In a further advantageous embodiment of the communication device, the near field communication interface of the communication device is further designed to receive an operating parameter of the parameterizable energy supply device via the near field communication network. This thereby achieves the advantage of enabling the realization of bi-directional communication between the communication device and the parameterizable energy supply device.

According to a third aspect of the invention, the task is solved by an energy supply system, comprising: a parameterizable energy supply device; and a communication device for the parameterizing of the parameterizable energy supply device over a near field communication network. This thereby achieves the advantage of the parameterizable energy supply device and the communication device being able to be galvanically isolated.

According to a fourth aspect of the invention, the task is solved by a method for parameterizing a parameterizable energy supply device which comprises: wirelessly transmitting parameterizing data to the parameterizable energy supply device over a communications network; and setting at least one operating parameter of the parameterizable energy supply device based on the parameterizing data as received in the parameterizable energy supply device. This thereby achieves the advantage of being able to provide an efficient method for parameterizing a parameterizable energy supply device.

The parameterizing data can be transmitted wirelessly from the communication device to the parameterizable energy supply device.

According to a fifth aspect of the invention, the task is solved by a casing for the parameterizable energy supply device, wherein an outer wall of the casing comprises a position indicator which indicates a physical position of the wireless communication interface of the parameterizable energy supply device disposed within the casing in order to enable parameterizing of the parameterizable energy supply device disposed within said casing. This thereby achieves the advantage of being able to efficiently parameterize the parameterizable energy supply device within the casing.

The position indicator can be provided as a symbol printed on the casing's outer wall.

BRIEF DESCRIPTION OF THE DRAWINGS

Embodiments of the invention are depicted in the drawings and will be described in greater detail below.
Shown are.

DETAILED DESCRIPTION OF VARIOUS EMBODIMENTS

Figure 1:
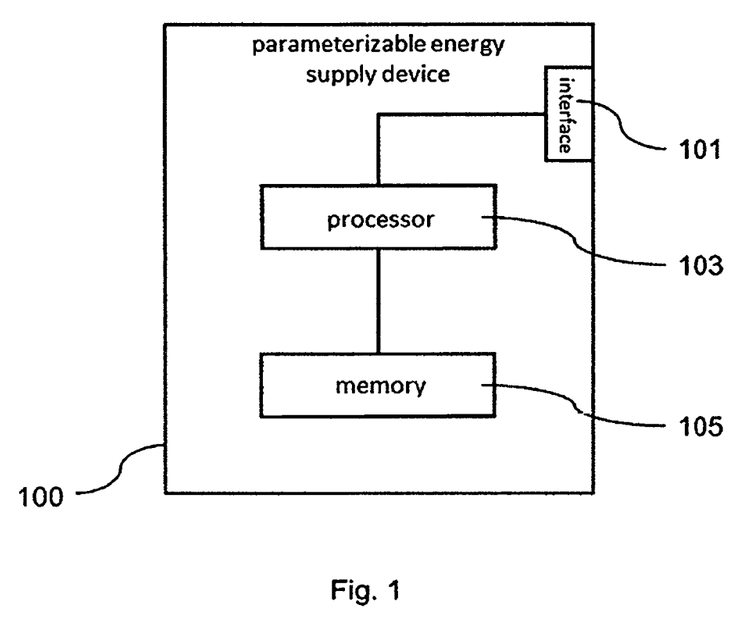
FIG. 1 a schematic diagram of a parameterizable energy supply device according to one embodiment.

FIG. 1 shows a schematic diagram of a parameterizable energy supply device 100 according to one embodiment. The parameterizable energy supply device 100 comprises a wireless communication interface 101, a processor 103 and a memory 105.

The parameterizable energy supply device 100 can be designed to comprise: a wireless communication interface 101 for receiving parameterizing data for the parameterizing of the parameterizable energy supply device 100 via a communications network; and a processor 103 which is designed to set at least one operating parameter of the parameterizable energy supply device 100 on the basis of the parameterizing data received.

The parameterizable energy supply device 100 can be a voltage supply unit or a current supply unit having at least one configurable operating parameter. The operating parameter can be a target value for an electrical output voltage or an electrical output current of the parameterizable energy supply device 100. For example, the parameterizable energy supply device 100 comprises an electronically adjustable potentiometer for adjusting the electrical output voltage or the electrical output current of the parameterizable energy supply device 100. Furthermore, the operating parameter can be associated with an electrical output characteristic curve of the parameterizable energy supply device 100 or an overload response of the parameterizable energy supply device 100. When the parameterizable energy supply device 100 further comprises a signal input, the operating parameter can then be a parameter for evaluating the signals received via the signal input. If the signal input is for example designed to remotely activate the parameterizable energy supply device 100, the operating parameter can then be an electrical voltage threshold for the input signal, wherein the parameterizable energy supply device 100 is activated if the electrical voltage of the input signal exceeds the threshold and/or is deactivated if the electrical voltage of the input signal undercuts the threshold.

The parameterizing data can comprise an operating parameter and/or information for selecting an operating mode or an operating parameter. As an example, the parameterizable energy supply device 100 has a first operating mode with predetermined first operating parameters and a second operating mode with predetermined second operating parameters, wherein the respective operating mode is set on the basis of said information.

The processor 103 can further be designed to check the received parameterizing data and/or operating parameter for validity. For example, the operating parameter can be checked as to whether it falls short of or exceeds a predetermined threshold. Furthermore, the validity of the parameterizing data and/or the operating parameter can be checked by means of cyclic redundancy, e.g. pursuant to the Cyclic Redundancy Check 8 (CRC-8) standard.

The wireless communication interface 101 can be a radio frequency identification interface for communicating via Radio Frequency Identification (RFID), e.g. pursuant to the ISO/IEC 14443 or ISO/IEC 18000-3 standard. The wireless communication interface 101 can furthermore be a near field communication interface for communicating via Near Field Communication (NFC), e.g. pursuant to the ISO/IEC 14443 or ISO/IEC 18092 standard. The wireless communication interface 101 can furthermore be configured to communicate pursuant to the Bluetooth, ZigBee or Wireless Local Area Network (W-LAN) standards.

The communications network can be a radio network, e.g. a near field communication network, a telephone network, e.g. a mobile radio network, a computer network, e.g. a Wireless Local Area Network (W-LAN) and/or the internet.

The parameterizable energy supply device 100 can further be designed with a memory 105 for storing the received parameterizing data, wherein the processor 103 is designed to read out the parameterizing data from the memory 105 and set the operating parameter of the parameterizable energy supply device 100 on the basis of the parameterizing data as read.

The memory 105 can comprise an electrically erasable programmable read-only memory, e.g. Electrically Erasable Programmable Read-Only Memory (EEPROM). The processor 103 can further be designed to read the parameterizing data from the memory 105 upon the parameterizable energy supply device 100 being activated.

According to one embodiment, an electrical output voltage or an electrical output current of the parameterizable energy supply device 100 can be set or parameterized by means of a potentiometer.

Figure 2:
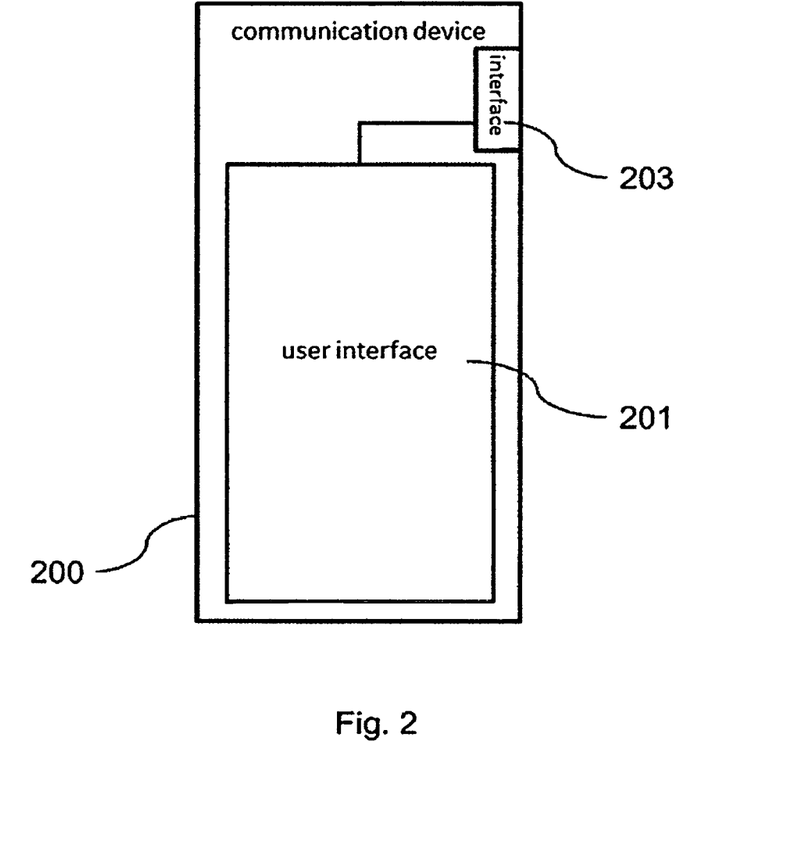
FIG. 2 a schematic diagram of a communication device for parameterizing a parameterizable energy supply device via a near field communication network according to one embodiment.

FIG. 2 shows a schematic diagram of a communication device 200 for the parameterizing of a parameterizable energy supply device 100 via a near field communication network according to one embodiment. The communication device 200 comprises a user interface 201 and a near field communication interface 203.

The communication device 200 for parameterizing a parameterizable energy supply device 100 via a near field communication network can be configured with: a user interface 201 for defining parameterizing data for the parameterizing of the parameterizable energy supply device 100; and a near field communication interface 203 for transmitting the defined parameterization data to the parameterizable energy supply device 100 via the near field communication network.

The communication device 200 can be a computer, a smartphone or a hand-held device. The communication device 200 can furthermore be a mobile communication device. The user interface 201 can comprise a keyboard, a display mechanism and/or a touchscreen.

Figure 3:
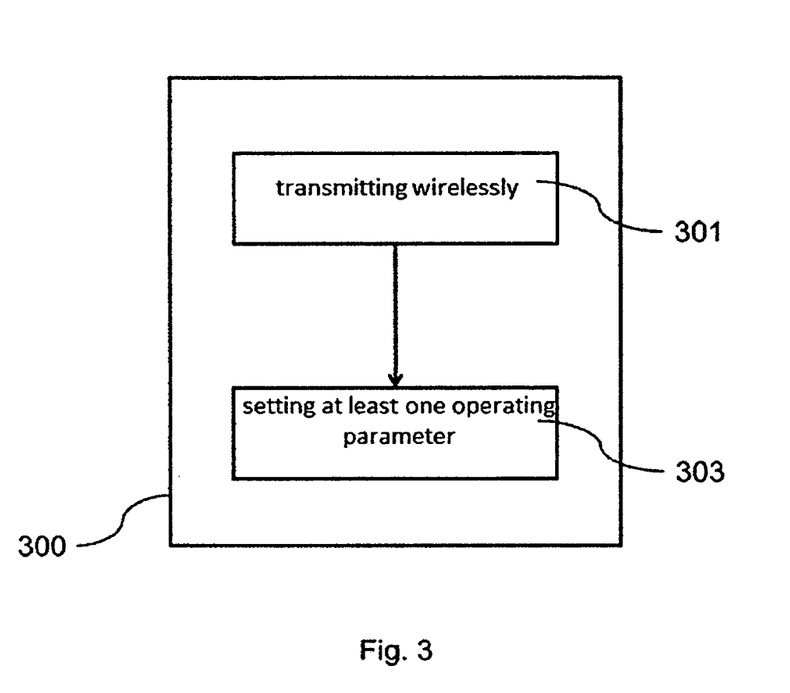
FIG. 3 a schematic diagram of a method for parameterizing a parameterizable energy supply device.

FIG. 3 shows a schematic diagram of a method 300 for parameterizing a parameterizable energy supply device 100. The method 300 comprises the steps of wireless transmission 301 and setting 303.

The method 300 for parameterizing a parameterizable energy supply device 100 comprises: wirelessly transmitting 301 parameterizing data to the parameterizable energy supply device 100 over a communications network; and setting 303 at least one operating parameter of the parameterizable energy supply device 100 based on the parameterizing data as received in the parameterizable energy supply device 100.

The parameterizing data can be transmitted wirelessly from the communication device 200 to the parameterizable energy supply device 100.

Figure 4:
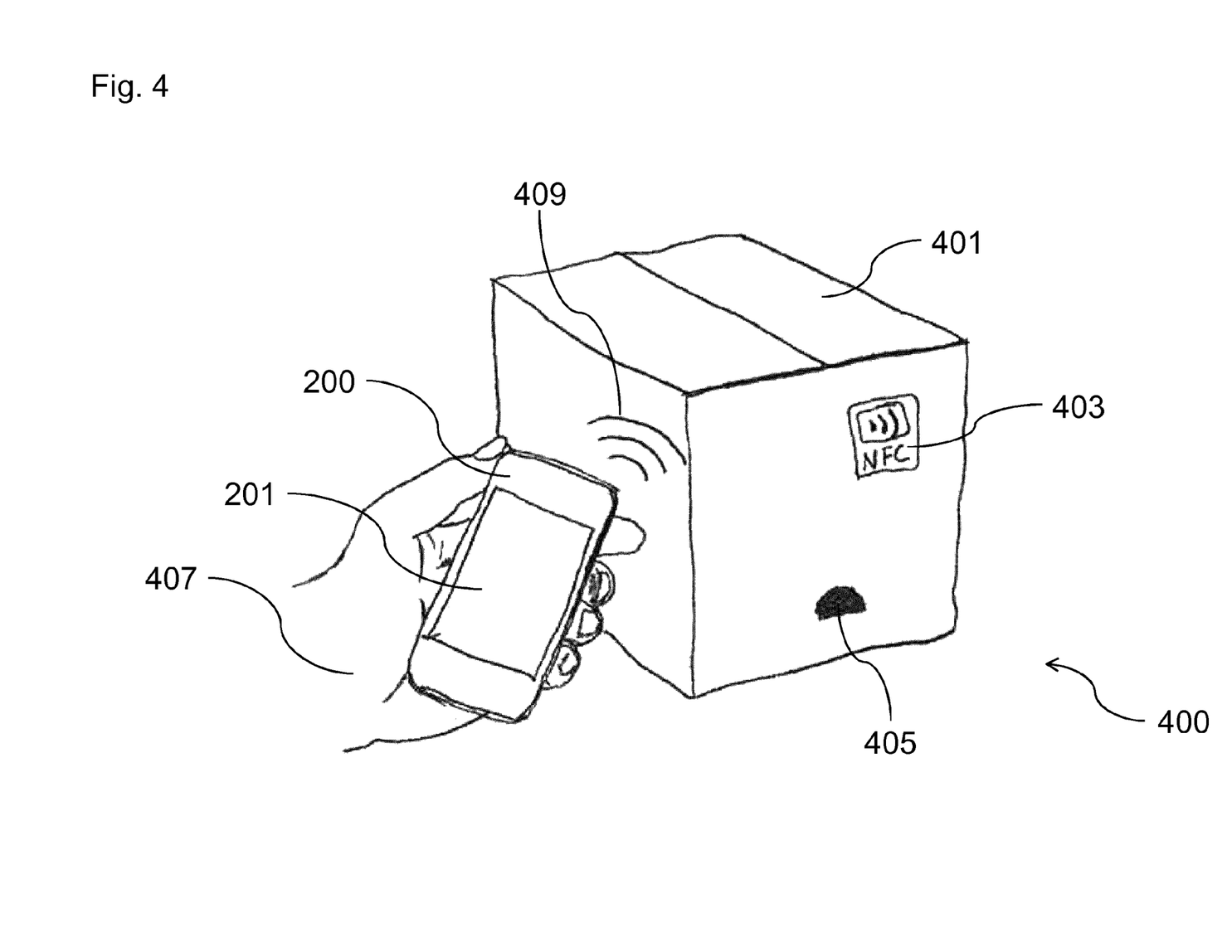
FIG. 4 a schematic representation of an arrangement for the parameterizing of a parameterizable energy supply device disposed within a casing by means of a communication device.

FIG. 4 shows a schematic representation of an arrangement 400 for the parameterizing of a parameterizable energy supply device 100 disposed within a casing 401 by means of a communication device 200. The casing 401 comprises a position indicator 403 and a hand hole 405. The communication device 200 is held in a hand 407 of a user of the communication device 200 and comprises a user interface 201. An electromagnetic signal 409 is further depicted.

An outer wall of the casing 401 comprises a position indicator 403 which indicates a physical position of the wireless communication interface 101 of the parameterizable energy supply device 100 disposed within the casing 401 in order to enable a parameterizing of the parameterizable energy supply device 100 disposed within said casing 401.

The position indicator 403 can be provided as a symbol printed on the outer wall of the casing 401.

By means of the user interface 201, the user of the communication device 200 can define parameterizing data which can be transmitted to the deactivated parameterizable energy supply device 100 accommodated within the casing 401 via near field communication. The transmission of the parameterizing data is symbolized by electromagnetic signal 409.

The position indicator 403 on the casing 401 marks the position of the not shown wireless communication interface 101 of the parameterizable energy supply device 100. When the user holds the communication device 200, or the not shown near field communication interface 203 of the communication device 200 respectively, to the position indicator 403, the wireless communication interface 101 of the parameterizable energy supply device 100 can then be supplied with electrical energy wirelessly and the parameterizable energy supply device 100 parameterized.

According to one embodiment, the parameterizable energy supply device 100 or a power supply can be freely interconnected or grounded on the secondary side.

According to a further embodiment, the wireless communication interface 101 of the parameterizable energy supply device 100 or an NFC receiver can be connected on the primary side.

All of the features described and shown in connection with individual embodiments of the invention can be provided in different combinations in the inventive subject matter so as to realize their advantageous effects simultaneously.

The protective scope of the present invention is conferred by the claims and is not limited by the features defined in the description or illustrated in the figures.

LIST OF REFERENCE NUMERALS 100 parameterizable energy supply device
101 wireless communication interface
103 processor
105 memory
200 communication device
201 user interface
203 near field communication interface
300 method
301 wireless transmission
303 setting
400 arrangement
401 casing
403 position indicator
405 hand hole
407 hand
409 electromagnetic signal

The invention claimed is:

1. A parameterizable energy supply device, comprising:
a wireless communication interface for receiving parameterizing data for parameterizing the parameterizable energy supply device via a communications network; and
a processor which is designed to set at least one operating parameter of the parameterizable energy supply device on the basis of the parameterizing data as received,
wherein the wireless communication interface comprises a near field communication interface,
wherein the parameterizable energy supply device further comprises a memory that stores the received parameterizing data, wherein the processor is designed to read out the parameterizing data from the memory and set the operating parameter of the parameterizable energy supply device on the basis of the parameterizing data as read out,
wherein the wireless communication interface is configured to be wirelessly supplied with electrical energy,
wherein the processor is further designed to read the parameterizing data from the memory upon the parameterizable energy supply device being activated,
wherein the set operating parameter is permanently stored, and
wherein the processor is further configured to check the received parameterizing data and the at least one operating parameter for validity
by checking whether the at least one operating parameter falls short of or exceeds a predetermined threshold and
by checking the validity of the parameterizing data and the at least one operating parameter by means of cyclic redundancy.

2. The parameterizable energy supply device according to claim 1, wherein
the wireless communication interface is designed to wirelessly receive the parameterizing data from a communication device via the communications network.

3. The parameterizable energy supply device according to claim 1, wherein
the wireless communication interface is further designed to transmit the operating parameter to a communication device via a communications network.

4. The parameterizable energy supply device according to claim 1, wherein
the wireless communication interface is arranged within a housing of the parameterizable energy supply device.

5. The parameterizable energy supply device according to claim 1, wherein
the wireless communication interface comprises an antenna which is arranged within a housing of the parameterizable energy supply device.

6. The parameterizable energy supply device according to claim 1, wherein
the operating parameter is or comprises an electrical output voltage or an electrical output current.

7. The parameterizable energy supply device according to claim 1 having a display mechanism for displaying the operating parameter.

8. The parameterizable energy supply device according to claim 1 having a contact-based communication interface for transmitting the operating parameter over a further communications network.

9. A casing for the parameterizable energy supply device according to claim 1, wherein an outer wall of the casing comprises a position indicator which indicates a physical position of the wireless communication interface of the parameterizable energy supply device disposed within the casing in order to enable parameterizing of the parameterizable energy supply device disposed within said casing.

10. The parameterizable energy supply device according to claim 1, wherein the wireless communication interface is integrated into a housing wall of a housing of the parameterizable energy supply device.

11. The parameterizable energy supply device according to claim 1, wherein the wireless communication interface comprises an antenna which is integrated into a housing wall of a housing of the parameterizable energy supply device.

12. The parameterizable energy supply device according to claim 1, wherein the operating parameter is or comprises a frequency of the electrical output voltage of the parameterizable energy supply device.

13. The parameterizable energy supply device according to claim 1, wherein the operating parameter is or comprises a frequency of the electrical output current of the parameterizable energy supply device.

14. The parameterizable energy supply device according to claim 1, wherein the memory comprises an electrically erasable programmable read-only memory (EEPROM).

15. The parameterizable energy supply device according to claim 1, wherein the processor is further configured to check the received parameterizing data for validity by checking the validity of the parameterizing data by means of cyclic redundancy.

16. The parameterizable energy supply device according to claim 1, wherein the processor is further configured to check the at least one operating parameter for validity by checking whether the at least one operating parameter falls short of or exceeds a predetermined threshold.

17. The parameterizable energy supply device according to claim 1, wherein the processor is further configured to check the at least one operating parameter for validity by checking the at least one operating parameter by means of cyclic redundancy.

18. A communication device for the parameterizing of a parameterizable energy supply device via a near field communication network, comprising:
a user interface for defining parameterizing data for the parameterizing of the parameterizable energy supply device; and
a near field communication interface for transmitting the defined parameterization data to the parameterizable energy supply device over the near field communication network,
wherein the parameterizable energy supply device comprises a memory that stores the received parameterizing data and a processor, wherein the processor is designed to read out the parameterizing data from the memory and set the operating parameter of the parameterizable energy supply device on the basis of the parameterizing data as transmitted by the communication device and read out by the processor,
wherein the near field communication interface of the communication device is further designed to wirelessly supply a near field communication interface of the parameterizable energy supply device with electrical energy such that the processor is reads the parameterizing data from the memory upon the parameterizable energy supply device being activated,
wherein the set operating parameter is permanently stored, and
wherein the processor is further configured to check the received parameterizing data and the at least one operating parameter for validity
by checking whether the at least one operating parameter falls short of or exceeds a predetermined threshold and
by checking the validity of the parameterizing data and the at least one operating parameter by means of cyclic redundancy.

19. The communication device according to claim 18, wherein the near field communication interface of the communication device is further designed to receive an operating parameter of the parameterizable energy supply device via the near field communication network.

20. A method for parameterizing a parameterizable energy supply device, the method comprising:
wirelessly transmitting parameterizing data to the parameterizable energy supply device over a communications network over a near field communication interface;
storing received parameterizing data in a memory of the parameterizable energy supply device;
reading out the stored parameterizing data on by a processor of the parameterizable energy supply device; and
setting at least one operating parameter of the parameterizable energy supply device based on the parameterizing data as received in the parameterizable energy supply device and on the basis of the parameterizing data as read out;
supplying wirelessly the wireless communication interface with electrical energy,
wherein the processor of the parameterizable energy supply device reads the parameterizing data from the memory upon the parameterizable energy supply device being activated,
wherein the set operating parameter is permanently stored, and
wherein the processor checks the received parameterizing data and the at least one operating parameter for validity by the processor checking whether the at least one operating parameter falls short of or exceeds a predetermined threshold and by the processor checking the validity of the parameterizing data and the at least one operating parameter by means of cyclic redundancy.

\* \* \* \* \*